United States Patent [19]

Bobb et al.

[11] Patent Number: 4,859,059

[45] Date of Patent: Aug. 22, 1989

[54] THERMAL MODULATION OF LIGHT BEAMS

[75] Inventors: Lloyd C. Bobb, Warminster; Barbara J. White, Hatboro; Jon P. Davis, Willow Grove, all of Pa.

[73] Assignee: The United States of America as represented by the Secretary of the Navy, Washington, D.C.

[21] Appl. No.: 145,020

[22] Filed: Jan. 13, 1988

[51] Int. Cl.$^4$ .............................................. G01D 9/02
[52] U.S. Cl. .................................. 356/345; 350/96.13; 350/359
[58] Field of Search ...................... 356/345; 333/1.1; 350/3.74, 96.13, 353, 359, 360

[56] References Cited

U.S. PATENT DOCUMENTS

| | | | |
|---|---|---|---|
| 3,946,370 | 3/1976 | Schmidt et al. | 350/3.74 |
| 4,588,296 | 5/1986 | Cahill et al. | 356/350 |
| 4,675,522 | 6/1987 | Arunkumar | 356/345 |
| 4,753,505 | 6/1988 | Mikami et al. | 350/96.13 |

*Primary Examiner*—Vincent P. McGraw
*Assistant Examiner*—S. A. Turner
*Attorney, Agent, or Firm*—Susan E. Verona; John M. O'Meara

[57] ABSTRACT

The phase of light passing through an optical waveguide is modulated by applying electric current to heat the waveguide and thereby alter the length and refractive index thereof. An application for the thermal phase modulation concept is provided in a Mach-Zehnder interferometer.

6 Claims, 1 Drawing Sheet

THERMAL MODULATION OF LIGHT BEAMS

STATEMENT OF GOVERNMENT INTEREST

The invention described herein may be used by and for the Government of the United States of America for governmental purposes without the payment of any royalties thereon or therefor.

BACKGROUND OF THE INVENTION

The present invention relates to light beam phase modulators and more particularly to such modulators for maintaining quadrature phasing between the light beams which are utilized in interferometers.

Modulators for changing the phase of a light beam passing through an optical waveguide are well known to those skilled in the optical arts. One application for such modulators is found in interferometers of the type wherein a physical parameter is sensed by directing light beams through two separate optical waveguides and wherein means is included for maintaining quadrature phasing between those light beams to permit direct readout from only one of the waveguides. In this application, that one optical waveguide is varied in length and refractive index, which adjusts the optical path length. To vary the length of that optical waveguide, a piezoelectric stretcher is commonly utilized which applies stress to that optical waveguide in some proportion with the voltage applied thereto. Characteristically, such stretchers operate at high voltages, which present difficulties when interferometers are operated outside the laboratory environment. Also, a lengthy piece of optical waveguide is wrapped around the piezoelectric material. Such stretchers are somewhat massive when compared with the other components in the interferometer. Furthermore, when the physical parameter is to be sensed in water, the piezoelectric stretcher must be waterproofed with potting material which only adds further bulk to the interferometer.

SUMMARY OF THE INVENTION

It is the general object of the present invention to control the length and refractive index of an optical waveguide by applying heat thereto with an electric current.

It is a specific object of the present invention to provide a phase modulator for varying the optical path length through an optical waveguide in accordance with the above stated general object.

It is another specific object of the present invention to provide an interferometer wherein the optical path length through an optical waveguide is varied in accordance with the above stated general object.

These and other objects are accomplished using the light beam phase modulating concept of this invention by disposing an electrically resistive element at a thermal interface with the optical waveguide. Heat in proportion to the square of current passed through the resistive element causes thermal expansion therein which varies the length and refractive index thereof in accordance with the desired phase modulation. Either or both the area of the interface and the current are sized in accordance with the desired response of the phase modulation. The scope of the present invention is only limited by the appended claims for which support is predicated on the preferred embodiments hereinafter set forth in the following description and the attached drawings wherein like reference characters refer to like elements throughout the several figures.

DESCRIPTION OF THE PREFERRED EMBODIMENTS

Figure 1:
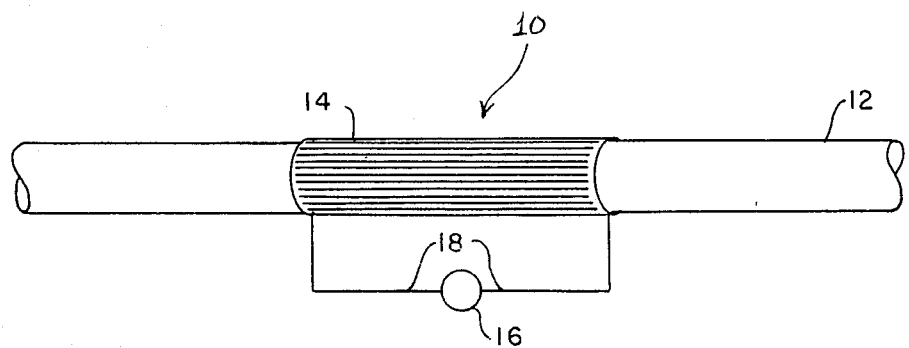
FIG. 1 illustrates an optical fiber waveguide having one preferred embodiment of the invention incorporated therewith.

As one preferred embodiment of the invention, a modulator 10 of the type which controls the phase of a light beam passing through an optical waveguide 12, such as an optical fiber, is illustrated in FIG. 1. In the modulator 10, an electrically resistive element 14 is disposed at a thermal interface with the optical waveguide 12. Heat in proportion to the square of current passed through the resistive element varies the refractive index and the length thereof in accordance with the desired phase modulation. Any voltage means 16 may be utilized for passing current through the resistive element 14, such as a dc voltage source connected across the ends thereof. As is well known to those skilled in the electrical arts, the voltage means 16 passes current through the element 14 and generates power therein of a magnitude equal to that current squared multiplied by the resistance of the element 14, or $I^2R$. Of course, some of the heat generated in the element 14 is conducted through the thermal interface to the optical waveguide 12 which expands or changes in configuration at a rate dependent on how fast the heat is applied thereto. The response time of the desired phase modulation can be enhanced by increasing the power generated in the element 14 or by decreasing the diameter of the optical fiber.

Although the resistive element 14 may have various configurations within the scope of the invention, a cylindrical configuration thereof has been found to be easily fabricated. In the cylindrical configuration, the element 14 circumferentially encloses a longitudinal portion of the optical waveguide 12 and is fabricated from a metal material, such as gold which can be vacuum deposited thereon. Voltage means 16 may be conventionally connected to the element 14 through wires 18 which are affixed thereto using any suitable technique, such as bonding. If direct connection thereto is objectionable, thick conductors (not shown) of very low resistance can also be vacuum deposited to extend from the element 14 on the waveguide 12, along the longitudinal axis thereof. The wires 18 may then be connected to such conductors at a remote location from the resistive element 14 using any suitable technique. Many other fabrication techniques and materials can be utilized for the resistive element 14. For example a copper spring of substantially cylindrical shape could be fabricated independently of the optical waveguide 12 and manipulated thereonto, such as with special tooling. Furthermore, when the waveguide 12 consists of optical fiber, the resistive element 14 may interface with either the clad which is disposed over the core thereof, or the removable outer jacket thereof. For jacketed fibers the response time will be slightly slower but a higher number of fringe shifts will be realized per unit temperature change in the optical fiber. Of course, the thinner its cylindrical wall, the lower the thermal mass of the resistive element 14 and therefore, the shorter is the response time for the same magnitude of power applied thereto.

Figure 2:
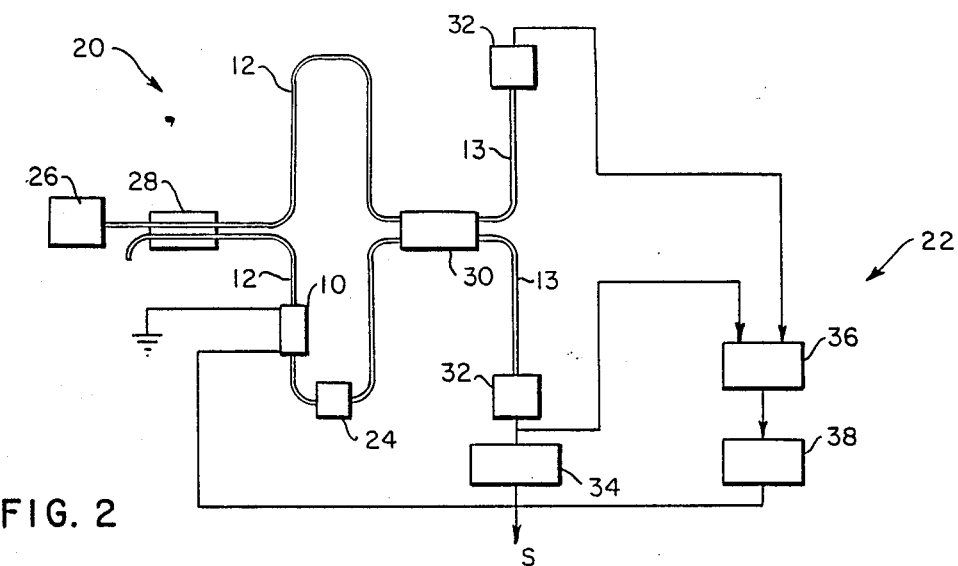
FIG. 2 illustrates a Mach-Zehnder interferometer wherein the invention is incorporated to maintain quadrature phasing between the sensing and reference legs thereof.

A particular application for the modulator 10 of this invention is found in a Mach-Zehnder interferometer 20, such as is illustrated in FIG. 2. Substantially identical light beams are directed through two separate optical waveguides 12 within the interferometer 20 and means 22 is included therein for maintaining quadrature phasing therebetween to permit the magnitude of a physical parameter to be read out directly from only one of the output waveguides 13. Magnetic field intensity is one such physical parameter which is commonly sensed in this manner and requires that a magnetostrictive device 24 be disposed on one of the waveguides 12. Although the modulator 10 and the magnetostrictive device 24 is shown to be on the same waveguide 12 in FIG. 2, they could each be disposed on a different waveguide 12. The light beams originate from a laser 26 and pass through a beam splitter 28 to the optical waveguides 12. Each beam passes through a beam combiner 30 and through an output waveguide 13 to a separate detector means 32, such as a photodiode, for deriving an electrical signal in direct proportion to the intensity (I) of each light beam passing therefrom. Output from one detector means 32 is processed through a readout circuit 34 to produce the magnetic field intensity signal S.

Figure 3:
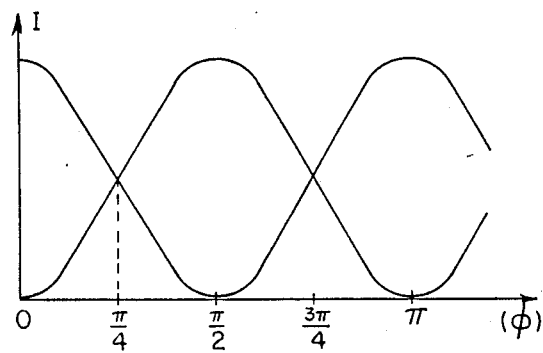
FIG. 3 is the light intensity verses phase diagram for the interferometer of FIG. 2.

In the quadrature phasing means 22, both outputs from the detector means 32 are connected to a summing junction means 36, such as an operational amplifier, for comparing those outputs to derive an error signal output in direct proportion with the magnitude of the differential existing therebetween. The error signal output from the summing junction means 36 is connected to a power amplifier means 38 for controlling a voltage output in direct proportion with that error signal output. Modulator 10 is connected within the quadrature phasing means 22 and receives the voltage output from the power amplifier means 38 which passes current therethough in inverse proportion to the resistance thereof. Heat develops in the modulator 10 because of this current and thermally induces stress in the optical waveguide 12 which changes the length and refractive index thereof to alter or shift the phase of the light beam propagating therethrough. As shown in FIG. 3, this phase shift causes the relative intensity of the light beams propagating through the output waveguides 13 to vary. Because heat is applied so long as any differential exists beween the outputs from the detector means 32, that differential is driven to zero when that phase shift reaches $\pi/4$ radians, for which the error signal output becomes zero to terminate the supply of current to the modulator 10. As is well known to those skilled in the art of interferometers, the slope of the intensity for both light beams reaches a maximum at the $\pi/4$ radians phase shift and therefore, the relative phasing therebetween is at quadrature.

For the interferometer application of FIG. 2, the sensitivity of the modulator 10 to small voltage changes is considerably greater than that of conventinal piezoelectric stretchers which are commonly utilized to obtain quadrature phasing. Furthermore, the length of the waveguide 12 in the modulator 10 is significantly reduced when compared to the length of the waveguide in a conventional piezoelectric stretcher. In a typical modulator 10, a 2.3 centimeter length of jacketed optical fiber waveguide produces a phase shift of over 300 radians per volt, whereas in a conventional piezoelectric stretcher, a 12 centimeter length of jacketed fiber produces a phase shift of only 0.08 radian per volt. Clearly, the modulator 10 of the invention requires shorter lengths of waveguide and may be operated at considerably lower voltages than conventional piezoelectric stretchers.

Those skilled in the art will appreciate without any further explanation that many modifications and variations are possible to the above disclosed thermal modulator embodiments, within the concept of this invention. Consequently, it should be understood that all such modifications and variations fall within the scope of the following claims.

What we claim is:

1. In a modulator of the type which controls the phase of a light beam passing through an optical fiber waveguide, the improvement comprising:
   an electrically resistive element disposed about a longitudinal portion of the optical fiber to establish a cylindrical thermal interface therebetween, said resistive element generating heat when a predetermined level of current is passed therethrough to cause thermal expansion in the optical fiber which varies the refractive index thereof in accordance with the desired phase modulation.

2. The modulator of claim 1 wherein the power dissipated in said resistive element is predetermined in accordance with the desired response of the phase modulation.

3. The modulator of claim 1 wherein the thickness of said electrically resistive element over said thermal interface is predetermined in accordance with the desired response of the phase modulation.

4. An interferometer of the type wherein a physical parameter is sensed by directing light beams through two separate optical fiber waveguides and wherein means is included for maintaining quadrature phasing between the light beams to permit direct readout from one of the optical fibers, said quadrature phasing means comprising:
   detector means for deriving a signal in proportion to the intensity of each light beam passing from the optical fibers;
   summing junction means connected to receive said intensity signals for deriving an error signal in proportion to the difference existing between the magnitude of said intensity signals, with that difference becoming zero when quadrature phasing is attained between said light beams;
   control means connected to receive said error signal for establishing a voltage level in proportion with said error signal; and
   electrically resistive means disposed about a longitudinal portion of one selected optical fiber to establish a cylindrical thermal interface therebetween for passing heat to the selected optical fiber when current is passed through said resistive means, and said resistive means is connected to have current directed therethrough in proportion to said voltage level of said control means so that variations in the length and refractive index of the selected optical fiber occur in accordance with the modulation required therein to maintain quadrature phasing.

5. The interferometer of claim 4 wherein the power dissipated in said electrically resistive means is predetermined in accordance with the desired response of said quadrature phasing means.

6. The interferometer of claim 4 wherein the thickness of said electrically resistive means over said thermal interface is predetermined in accordance with the desired response of said quadrature phasing means.

* * * * *